(12) United States Patent
Kim et al.

(10) Patent No.: US 11,237,424 B2
(45) Date of Patent: Feb. 1, 2022

(54) DISPLAY DEVICE

(71) Applicant: Samsung Display Co., LTD., Yongin-si (KR)

(72) Inventors: Young Gu Kim, Yongin-si (KR); Jiyun Park, Hwaseong-si (KR); Jongho Son, Seoul (KR); Jongmin Ok, Hwaseong-si (KR); Sun-Young Chang, Seoul (KR); Hyelim Jang, Hwaseong-si (KR); Baekkyun Jeon, Yongin-si (KR); Kyungseon Tak, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 16/881,362

(22) Filed: May 22, 2020

(65) Prior Publication Data

US 2021/0055601 A1    Feb. 25, 2021

(30) Foreign Application Priority Data

Aug. 19, 2019 (KR) ........................ 10-2019-0101317

(51) Int. Cl.
G02F 1/1335 (2006.01)

(52) U.S. Cl.
CPC .. G02F 1/133502 (2013.01); G02F 1/133528 (2013.01); *G02F 2202/28* (2013.01)

(58) Field of Classification Search
CPC ......... G02F 1/133502; G02F 1/133528; G02F 2202/28
See application file for complete search history.

(56) References Cited

U.S. PATENT DOCUMENTS

| | | | |
|---|---|---|---|
| 7,599,117 B2 * | 10/2009 | Goto | G02F 1/133526 359/453 |
| 9,507,059 B2 | 11/2016 | Shim et al. | |
| 9,507,060 B2 | 11/2016 | Shim et al. | |
| 10,268,063 B2 | 4/2019 | Ju et al. | |
| 2012/0075557 A1 * | 3/2012 | Hong | G02F 1/133524 349/96 |
| 2013/0299792 A1 | 11/2013 | Park et al. | |
| 2019/0049639 A1 | 2/2019 | Kanda et al. | |
| 2019/0129079 A1 | 5/2019 | Lee et al. | |
| 2020/0026135 A1 * | 1/2020 | Ki | G02F 1/134309 |

FOREIGN PATENT DOCUMENTS

| | | |
|---|---|---|
| JP | 6159385 B2 | 7/2017 |
| KR | 10-1602470 B1 | 3/2016 |
| KR | 10-1871552 B1 | 6/2018 |
| KR | 1020190016429 A | 2/2019 |
| KR | 1020190049419 A | 5/2019 |

* cited by examiner

*Primary Examiner* — Dung T Nguyen
(74) *Attorney, Agent, or Firm* — Cantor Colburn LLP (57) ABSTRACT

A display device includes a display panel from which light is emitted; and an optical film to which the light from the display panel is incident. The optical film includes: a first pattern layer having a first refractive index, and a second pattern layer having a second refractive index lower than the first refractive index, the second pattern layer including a plurality of hollow inorganic particles. The second pattern layer which has the second refractive index lower than the first refractive index and includes the plurality of hollow inorganic particles, is disposed further from the display panel than the first pattern layer.

20 Claims, 7 Drawing Sheets

DISPLAY DEVICE

This application claims priority to Korean Patent Application No. 10-2019-0101317, filed on Aug. 19, 2019, and all the benefits accruing therefrom under 35 U.S.C. § 119, the entire contents of which are hereby incorporated by reference.

BACKGROUND

(1) Field

The present disclosure herein relates to a display device, and more particularly, to a display device including an optical film.

(2) Description of the Related Art

Various types of display devices are used for providing image information. A liquid crystal display device is variously used in large display devices and portable display devices owing to low power consumption of the liquid crystal display device.

The liquid crystal display device provides light, emitted from a backlight unit, to a liquid crystal display panel to generate an image. In order to mitigate display quality degradation according to a viewing angle, optical films having various functions are added to the outside of the liquid crystal display panel within the liquid crystal display device.

SUMMARY

The present disclosure provides an optical film which improves a side viewing angle characteristic of a display device including the optical film.

The present disclosure also provides a display device in which side viewing angle characteristic is improved by optimizing refractive index values of two pattern layers within an optical film of the display device.

An embodiment provides a display device including: a display panel from which light is emitted; and an optical film to which the light from the display panel is incident. The optical film includes: a first pattern layer having a first refractive index, and a second pattern layer having a second refractive index lower than the first refractive index, the second pattern layer including a plurality of hollow inorganic particles. The second pattern layer which has the second refractive index lower than the first refractive index and includes the plurality of hollow inorganic particles, is disposed further from the display panel than the first pattern layer.

In an embodiment, a difference in the refractive indexes between the first pattern layer and the second pattern layer may be about 0.2 or more.

In an embodiment, the refractive index of the first pattern layer may be from about 1.4 to about 1.5.

In an embodiment, the refractive index of the second pattern layer may be from about 1.15 to about 1.27.

In an embodiment, each of the hollow inorganic particles may include a core portion and a shell portion which surrounds the core portion.

In an embodiment, each of the hollow inorganic particles may have a spherical shape, and an average diameter of the hollow inorganic particles may be from about 10 nanometers (nm) to about 200 nm.

In an embodiment, the second pattern layer may further include a matrix portion with which spaces between the plurality of hollow inorganic particles are filled.

In an embodiment, the matrix portion may include at least one of an acryl-based polymer, a silicon-based polymer, a urethane-based polymer and an imide-based polymer.

In an embodiment, the hollow inorganic particles may be from about 10 weight percent (wt %) to about 90 wt % with respect to a total weight of the matrix portion and the hollow inorganic particles in the second pattern layer.

In an embodiment, the first pattern layer may include a first base layer and a plurality of first protrusions extended from the first base layer.

In an embodiment, the second pattern layer may include: a second base layer facing the first base layer; and a plurality of second protrusions extended from the second base layer.

In an embodiment, each of the first protrusions and the second protrusions may have a stripe shape.

In an embodiment, the first pattern layer may include a plurality of first recesses defined between the first protrusions, the second pattern layer may include a plurality of second recesses defined between the second protrusions, the first protrusions may be disposed to correspond to the second recesses, respectively, and the second protrusions may be disposed to correspond to the first recesses, respectively.

In an embodiment, the first pattern layer may include an optically clear adhesive material.

In an embodiment, the optical film may be disposed directly on the display panel.

In an embodiment, a display device includes a display panel from which light is emitted; and an optical film to which the light from the display panel is incident. The optical film includes: a first pattern layer having a first refractive index of about 1.4 to about 1.5; and a second pattern layer facing the display panel with the first pattern layer therebetween and having a second refractive index of about 1.15 to about 1.27.

In an embodiment, the second pattern layer may include a plurality of hollow inorganic particles.

In an embodiment, a difference in the refractive indexes between the first pattern layer and the second pattern layer may be about 0.2 or more.

In an embodiment, the display panel may include: a first substrate and a second substrate facing each other; an optical control layer between the first substrate and the second substrate; and a polarization layer disposed on the second substrate. The first pattern layer may be disposed directly on the polarization layer.

In an embodiment, the first pattern layer may include an optically clear adhesive material.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Since embodiments of the invention may have various modifications and diverse shapes, particular embodiments are illustrated in the drawings and are described in the detailed description. However, this does not intent to limit the present disclosure within particular embodiments, and it should be understood that the present disclosure covers all the modifications, equivalents, and replacements within the idea and technical scope of the present disclosure.

In this specification, when a component (or a region, a layer, a portion, or the like) is referred to as being related to another element such as being "on," "connected to" or "coupled to" another component, it may be directly disposed/connected/coupled to another component, or an intervening third component may be also disposed therebetween.

However, in this application, being "directly on" may mean that there is no additional layer, film, region, plate, or the like between a part and another part such as a layer, a film, a region, a plate, or the like. For example, being "directly on" may mean that two layers or two members are disposed without using an additional member, such as an adhesive member, therebetween.

Like numbers refer to like components throughout. Also, in the drawings, the thicknesses, ratios, and dimensions of the components are exaggerated for effectively describing the technical features.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." "And/or" includes one or more combinations which may be defined by the associated components.

Although the terms such as first and second are used to describe various components, these components should not be limited by these terms. The terms are only used to distinguish one component from other components. For example, a first component may be referred to as a second component, and similarly, a second component may be referred to as a first component without departing from the scope of the invention. The expression of a singular form may include plural forms unless definitely indicating a particular case in terms of the context.

Also, terms of "below," "on lower side," "above," "on upper side" or the like may be used to describe the relationships of the components illustrated in the drawings. These terms have a relative concept, and are described on the basis of the directions illustrated in the drawings. In the specification, being "disposed on" may represent not only being disposed on the top surface but also being disposed on the bottom surface.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which the present disclosure belongs. Also, terms as defined in a commonly used dictionary should be construed as having the same meaning as in an associated technical context, and unless ideally or excessively construed as having formal meaning, the terms may be construed as defined apparently herein.

It should be understood that the term of "comprise," "have" or the like intends to specify the presence of a feature, a fixed number, a step, an operation, an element, a component, or a combination thereof described in the specification, but does not exclude the possibility of presence or addition of one or more other features, fixed numbers, steps, operations, elements, components, or combinations thereof.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a display device and an electronic apparatus including the same will be described with reference to the drawings.

Figure 1:
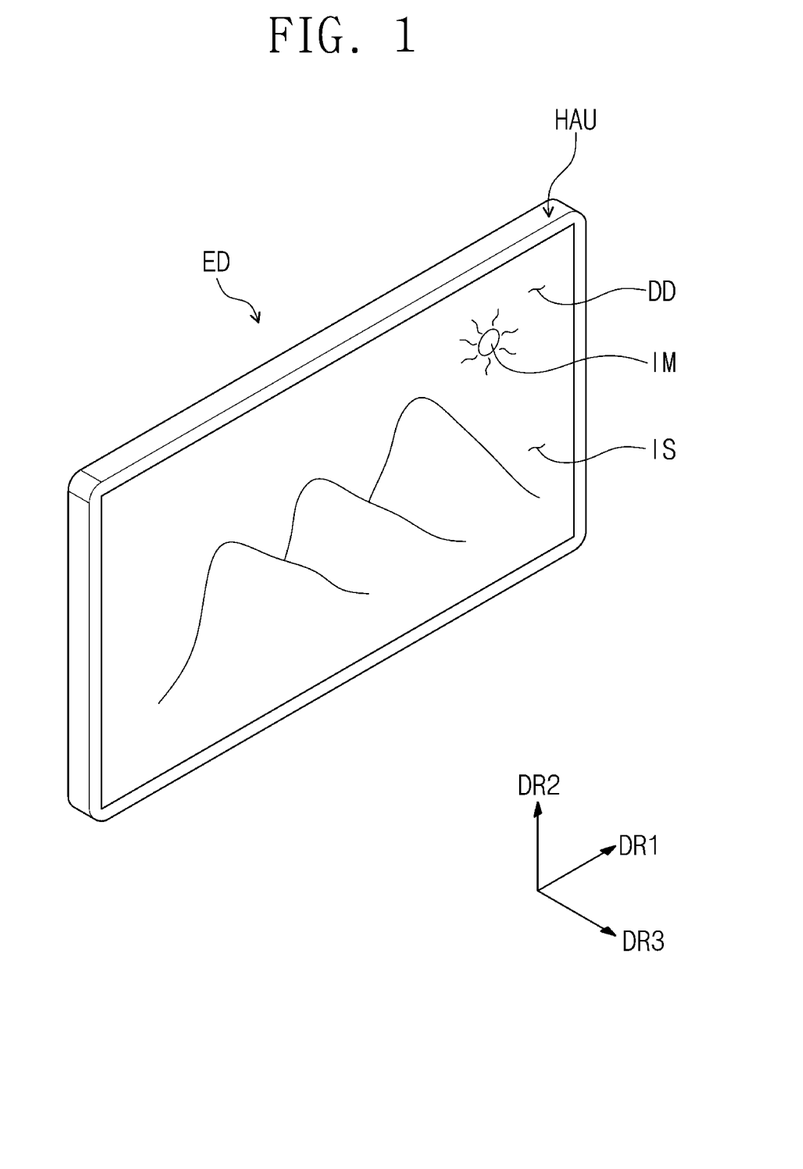
FIG. 1 is a perspective view of an embodiment of an electronic apparatus.
Figure 2:
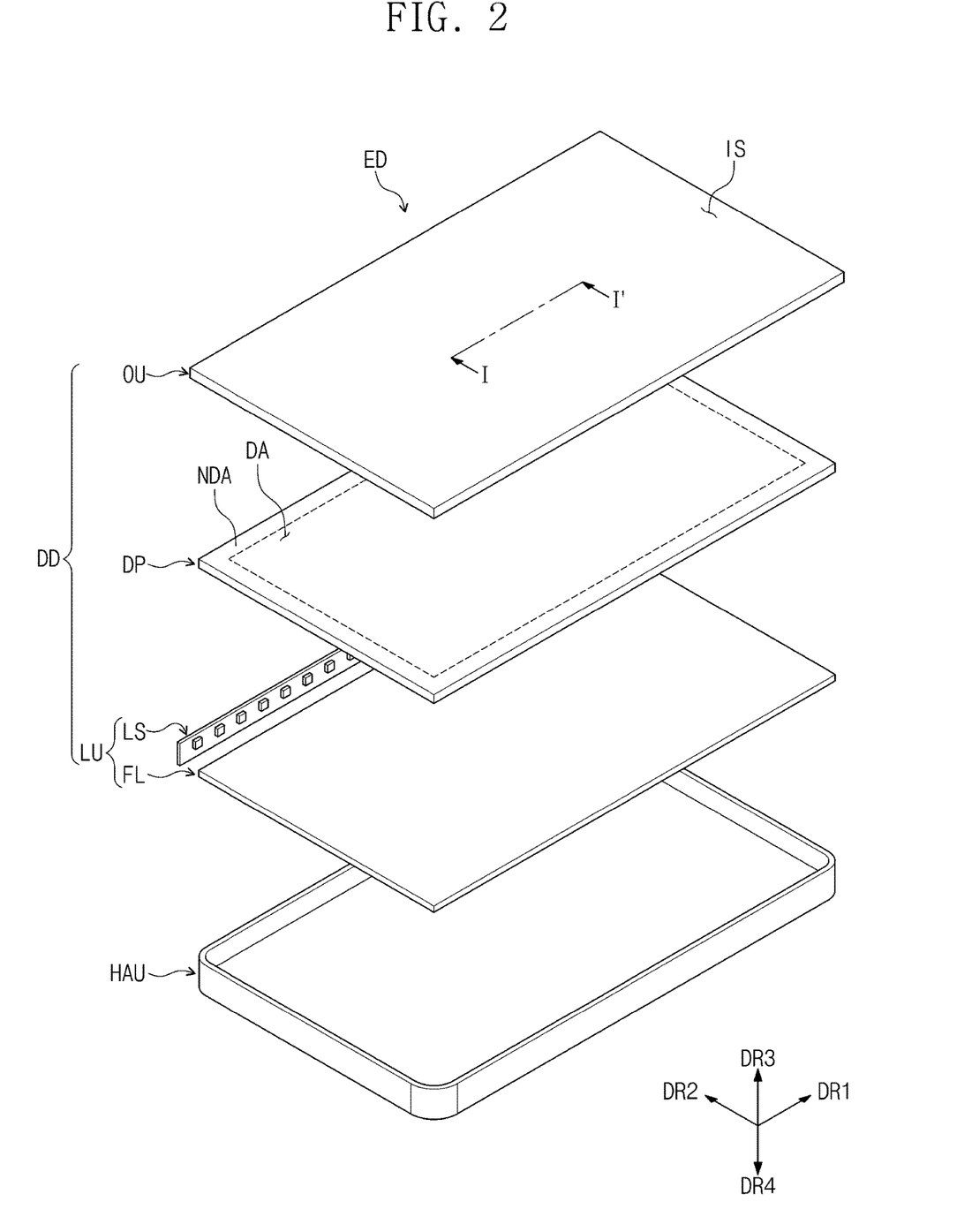
FIG. 2 is an exploded perspective view of the electronic apparatus illustrated in FIG. 1.
Figure 3:
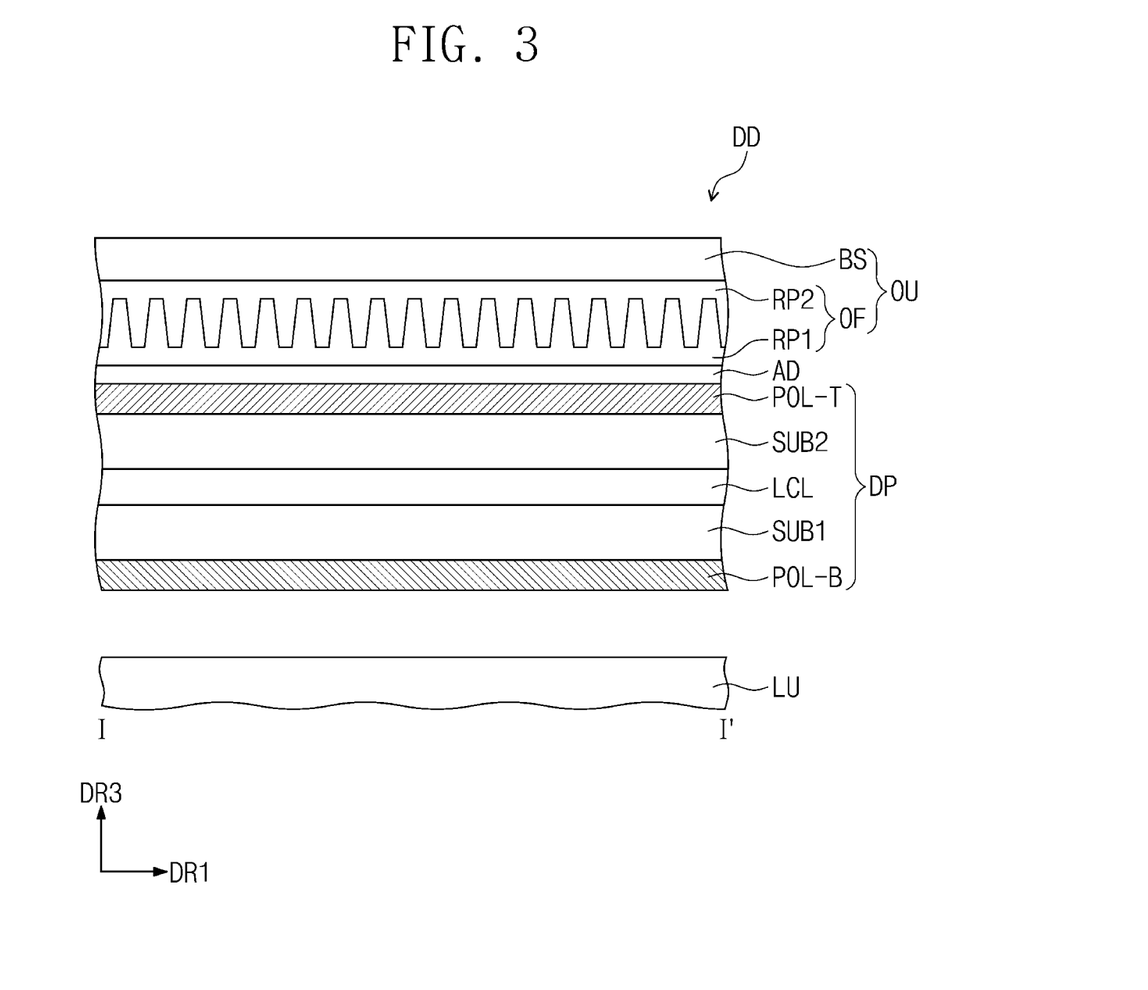
FIG. 3 is a cross-sectional view of an embodiment of a display device.
Figure 4:
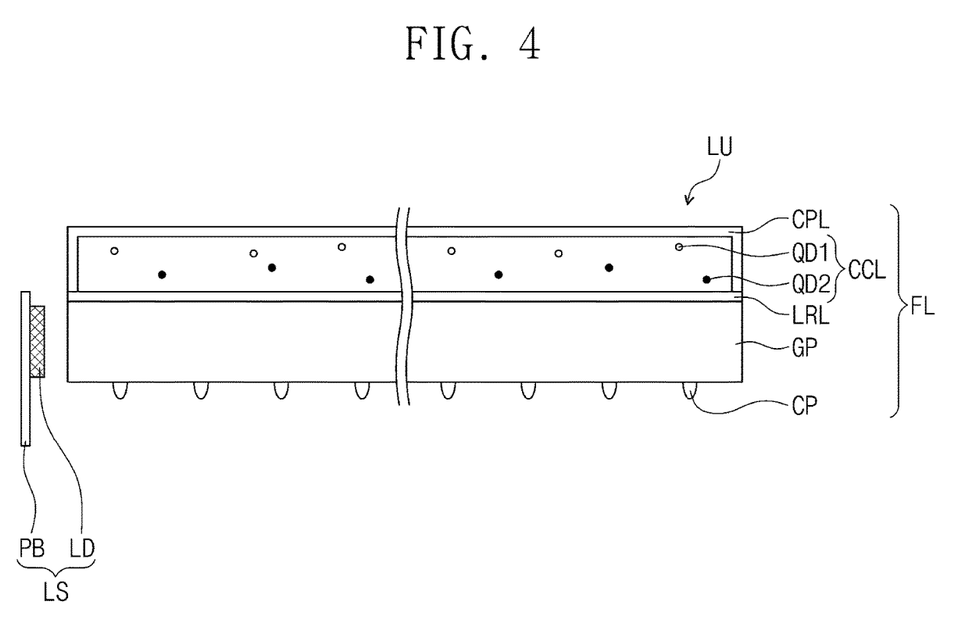
FIG. 4 is a cross-sectional view illustrating an embodiment of a light source member.

FIG. 1 is perspective view illustrating an embodiment of an electronic apparatus ED. FIG. 2 is an exploded perspective view of the electronic apparatus ED illustrated in FIG. 1. FIG. 3 is a cross-sectional view taken along line I-I' of FIG. 2. FIG. 3 is a cross-sectional view of another embodiment of a display device. FIG. 4 is a cross-sectional view of an embodiment of a light source member.

Figure 5:
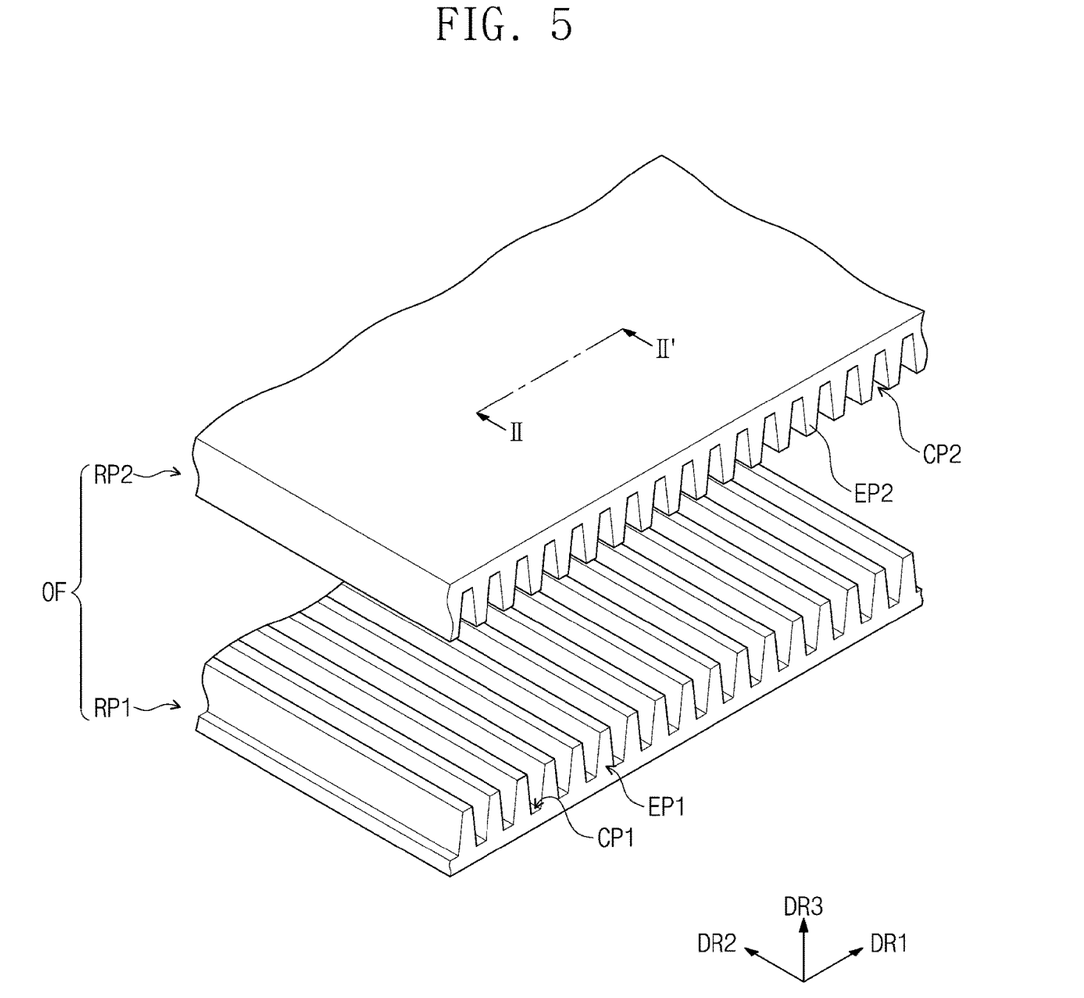
FIG. 5 is an exploded perspective view of an embodiment of an optical film.
Figure 6:
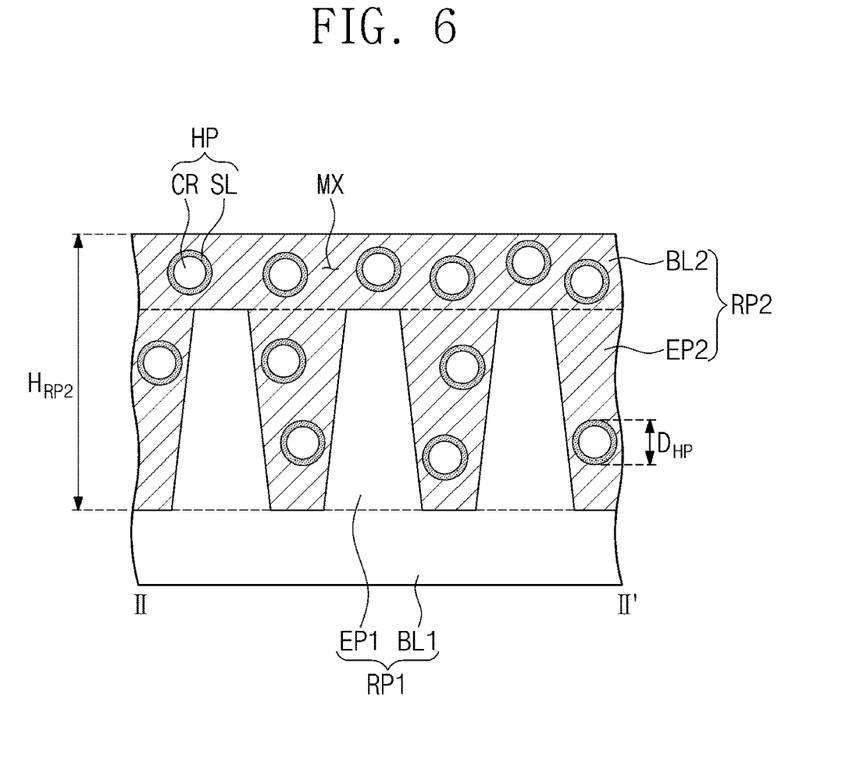
FIG. 6 is a cross-sectional view illustrating an embodiment of a portion of the optical film.

FIG. 5 is an exploded perspective view of an embodiment of an optical film. FIG. 6 is a cross-sectional view illustrating an enlarged portion of the optical film. FIG. 6 is a cross-sectional view taken along line II-IF of FIG. 5.

In an embodiment, an electronic apparatus ED may be a relatively large electronic apparatus such as a television, a monitor or an outdoor advertisement board. Also, the electronic apparatus ED may be a relatively small-to-medium electronic apparatus such as a personal computer, a laptop computer, a personal digital terminal, a vehicle navigation unit, a game console, a smart phone, a tablet and a camera. Also, these apparatuses are merely provided as embodiments, and other electronic apparatuses may be employed as long as not departing from the invention.

The electronic apparatus ED may include a display device DD and a housing HAU in which the display device DD is provided. The electronic apparatus ED may display an image IM through a display surface IS. In FIG. 1, the display surface IS is illustrated as being disposed in a plane which is parallel to a plane defined by a first directional axis DR1 (e.g., first direction) and a second directional axis DR2 (e.g., second direction) which crosses the first directional axis DR1. However, this is merely an example, and a display surface IS of the electronic apparatus ED in another embodiment may have a curved shape.

The normal direction relative to the display surface IS, that is, a direction, in which the image IM is displayed along the thickness direction of the electronic apparatus ED, is indicated as a third directional axis DR3 (e.g., third direction). Also, a direction that is opposite to the third directional axis DR3 in the thickness directions of the electronic apparatus ED is indicated as a fourth directional axis DR4 (e.g., fourth direction). A front surface (an upper surface, or a top surface) and a rear surface (a lower surface, or a bottom surface) for the electronic apparatus ED and in each of members thereof may be distinguished along the third directional axis DR3. However, directions indicated as the first to fourth directional axes DR1, DR2, DR3, and DR4 may be relative concepts and thus be changed into directions other than those indicated herein.

The housing HAU may accommodate the display device DD. The housing HAU may be disposed to cover portions of the display device DD while exposing the display surface IS that is a top surface of the display device DD. The housing HAU may cover side surfaces and a bottom surface of the display device DD, and expose an entirety of the top surface. However, the invention is not limited thereto, and the housing HAU may cover a portion of the top surface as well as the side surfaces and the bottom surface of the display device DD.

The display device DD may include a light source member LU, a display panel such as a liquid crystal display panel DP, and an optical member OU. The light source member LU may be disposed below the liquid crystal display panel DP, and the optical member OU may be disposed above the liquid crystal display panel DP.

In the display device DD according to an embodiment, the optical member OU includes an optical film OF. The optical film OF may be disposed above the liquid crystal display panel DP, that is, in a light emitting direction and/or an image display direction of the electronic apparatus ED. The optical member OU may include the optical film OF and a base film BS that supports the optical film OF.

FIG. 4 is a cross-sectional view illustrating an embodiment of the light source member LU. The light source member LU may include a light source LS and a functional layer FL that transmits light which is generated and emitted from the light source LS, to the liquid crystal display panel DP. The functional layer FL may include a guide panel GP, a low refractive layer LRL disposed on the guide panel GP, and a color conversion layer CCL disposed on the low refractive layer LRL. The light source LS may be disposed on a side of the guide panel GP. The light source LS may face the side of the guide panel GP (e.g., a light incident side of the guide panel GP). Here, the light source member LU may further include a barrier layer CPL disposed on the color conversion layer CCL. Also, a light-exit pattern CP may be provided in plural (e.g., a plurality of light-exit patterns CP) may be disposed on a bottom surface of the guide panel GP.

The light source LS of the light source member LU may include a circuit board PB and a light emitting element package LD provided in plural (e.g., plurality of light emitting element packages LD) disposed on the circuit board PB. The plurality of light emitting element packages LD may generate light and emit light having the same wavelength range. The light source LS may include a plurality of light emitting element packages LD that emit light having wavelength ranges different from each other. In an embodiment, the light emitting element packages LD may emit first light having a center wavelength at a wavelength range of about 440 nanometers (nm) to about 460 nm. In an embodiment, the light emitting element packages LD may emit blue light.

Although the light source LS is illustrated as being disposed adjacent to one side surface of the guide panel GP in the embodiment illustrated in FIG. 2, etc., the invention is not limited thereto, and the light source LS may be additionally disposed adjacent to a plurality of side surfaces of the guide panel GP unlike the illustration of FIG. 2 or FIG. 4.

Also, unlike the illustration of drawings, the light source LS may be disposed below the guide panel GP. That is, the light source LS may be provided as a direct-type lighting member.

The guide panel GP may include a glass substrate. However, the invention is not limited thereto, and the guide panel GP may be a transparent resin substrate. In an embodiment, for example, the guide panel GP may include or be made of an acryl-based resin (e.g., resin including acryl material) or the like.

The guide panel GP may include a top surface (e.g., light-exit surface) from which guided light exits the guide panel GP, a bottom surface facing the top surface, and a side surface which connects the top surface to the bottom surface. The side surface may be provided in plural, and one of the side surfaces may define a light incident surface of the guide panel GP. The plurality of light-exit pattern parts CP disposed on the bottom surface of the guide panel GP may transmit light, which is emitted from the light source LS and incident onto a surface of the guide panel GP, to another surface of the guide panel GP, or may change the direction of light so that the light incident toward the bottom surface of the guide panel GP is delivered toward a light-exit surface that is the top surface of the guide panel GP.

The low refractive layer LRL may be disposed on the guide panel GP. The low refractive layer LRL may be disposed directly on the guide panel GP. The low refractive layer LRL may have a refractive index lower than that of the guide panel GP. Since the low refractive layer LRL has the refractive index which is lower than the refractive index of the guide panel GP, the light incident from the light source LS onto a first side surface of the guide panel GP (e.g., light incident surface) may be effectively delivered to a second side surface of the guide panel GP that is relatively spaced apart from the light source LS, such as a second side surface facing the first side surface. That is, in the light source member LU according to an embodiment, the guide panel GP and the low refractive layer LRL provided on the guide panel GP together function as a light guide plate.

The light source member LU includes the color conversion layer CCL disposed on the low refractive layer LRL. The color conversion layer CCL may convert a color of the light provided from the light source LS and may deliver the color-converted light to the liquid crystal display panel DP. In an embodiment, for example, the light provided from the light source LS may pass through the color conversion layer CCL and be provided to the liquid crystal display panel DP as white light. In an embodiment, the color conversion layer CCL may include a first quantum dot QD1 provided in plural (e.g., first quantum dots QD1) together with a second quantum dot QD2 provided in plural (e.g., second quantum dots QD2) to include a plurality of quantum dots QD1 and QD2 that convert a color of incident light into one or more color having different wavelength ranges. When the light provided from the light source LS is a first light in a blue wavelength region, the color conversion layer CCL may include first quantum dots QD1 that are excited by blue light to emit green light and second quantum dots QD2 that are excited by blue light to emit red light.

The barrier layer CPL may be disposed on the color conversion layer CCL. The barrier layer CPL may serve for reducing or effectively preventing penetration of moisture and/or oxygen (hereinafter, referred to as moisture/oxygen) into the color conversion layer CCL. The barrier layer CPL may cover the color conversion layer CCL. The color conversion layer CCL may not be exposed outside the barrier layer CPL.

The liquid crystal display panel DP is disposed on and/or corresponding to the light source member LU. The liquid crystal display panel DP may include a first substrate SUB1 and a second substrate SUB2 that face each other, and an optical control layer such as a liquid crystal layer LCL disposed between the first substrate SUB1 and the second substrate SUB2.

The liquid crystal display panel DP may be divided into a display area DA and a peripheral area NDA which is adjacent to the display area DA. In a top plan view, the peripheral area NDA may surround the display area DA. The display area DA is an area at which an image IM is displayed, and the peripheral area NDA is an area which is adjacent to the display area along a plane defined by the first directional axis DR1 and the second directional axis DR2, and at which an image IM is not displayed (e.g., non-display area). The liquid crystal display panel DP may include a pixel in plural (e.g., a plurality of pixels) disposed on the display area DA.

In an array substrate from among the first substrate SUB1 and the second substrate SUB2, a signal line and a pixel circuit for the pixels are disposed. The array substrate may be connected to a main circuit board through a chip on film ("COF") or the like. A central control circuit for driving the liquid crystal display panel DP may be disposed in the main circuit board. The central control circuit may be a microprocessor. A chip of the COF may be a data driving circuit. A gate driving circuit may be mounted on the array substrate or integrated on the array substrate in a form of low temperature poly-silicon ("LTPS").

The liquid crystal layer LCL includes liquid crystals. In an embodiment, the liquid crystal layer LCL of the liquid crystal display panel DP may include liquid crystals that are vertically aligned. The liquid crystals included in the liquid crystal layer LCL may be vertically aligned relative to the first substrate SUB1 and the second substrate SUB2. In an embodiment, for example, the liquid crystals may be aligned at an inclination angle of about 88 degrees)(°) to about 90° relative to a top surface of the first substrate SUB1 or a bottom surface of the second substrate SUB2. In an embodiment of the display device DD, the liquid crystal display panel DP may be in a vertical alignment mode.

Here, the invention is not limited thereto, and the liquid crystal display panel DP in the display device DD may be various types of display panels such as a twisted nematic ("TN") mode, a horizontal alignment mode, a super vertical alignment ("SVA") mode, a super patterned vertical alignment ("S-PVA") mode, an optically compensated bend ("OCB") mode, or an electrically controlled birefringence ("ECB") mode. Also, the liquid crystal display panel DP may be driven by other driving methods for a display panel and have alignment direction types of liquid crystals, different from the above-described methods and types.

The liquid crystal display panel DP may include a top polarization layer POL-T and a bottom polarization layer POL-B (e.g., polarization layers POL-T and POL-B). FIG. 3 illustrates the bottom polarization layer POL-B disposed below the first substrate SUB1 that is a lower substrate of the liquid crystal display panel DP and the top polarization layer POL-T disposed above the second substrate SUB2 that is an upper substrate of the liquid crystal display panel DP.

The polarization layers POL-T and POL-B may include a linear polarizer. The linear polarizer may linearly polarize the light provided thereto in one direction. The linear polarizer may be a film-type polarizer including a stretched polymer film. In an embodiment, for example, the extended polymer film may be a stretched polyvinylalcohol-based film. Also, the linear polarizer may be a coating-type polarization layer.

Also, unlike the illustration of drawings, each of the polarization layers POL-T and POL-B may be an in-cell type polarization layer that is independently disposed between the first substrate SUB1 and the liquid crystal layer LCL or between the second substrate SUB2 and the liquid crystal layer LCL.

In an embodiment, for example, the bottom polarization layer POL-B may be the coating-type polarization layer or a polarization layer provided or formed by deposition. The bottom polarization layer POL-B may be provided or formed by applying materials that include a dichroic dye and a liquid crystalline compound. Alternatively, the bottom polarization layer POL-B may be a wire grid-type polarization layer. Here, the bottom polarization layer POL-B may be a film-type and disposed on a bottom side of the liquid crystal display panel DP. In this case, an adhesive layer may be further disposed between the bottom polarization layer POL-B and the liquid crystal display panel DP.

Also, the top polarization layer POL-T may be the coating-type polarization layer or the polarization layer provided or formed by deposition.

A transmission axis of the linear polarizer included in the top polarization layer POL-T disposed on the second substrate SUB2 may be perpendicular to a transmission axis of the linear polarizer included in the bottom polarization layer POL-B. However, the invention is not limited thereto.

Here, the polarization layers POL-T and POL-B may further include a phase delay layer, a light compensation layer, or the like. The phase delay layer, the light compensation layer, or the like may be disposed on a top surface or a bottom surface of the linear polarizer, and for example, may further include an adhesive layer between the linear polarizer and the phase delay layer or between the linear polarizer and the light compensation layer.

In an embodiment of the display device DD, the optical member OU may be disposed above the liquid crystal display panel DP. The optical member OU may include the optical film OF and the base film BS.

The optical film OF may be disposed above the liquid crystal display panel DP or in a light emission direction of the display device DD. In an embodiment, the optical film OF may be disposed above the top polarization layer POL-T. Also, an adhesive layer AD may be disposed between the top polarization layer POL-T and the optical film OF. The adhesive layer AD may couple the top polarization layer POL-T and the optical film OF to each other. However, the invention is not limited thereto, and the adhesive layer AD may be omitted.

The base film BS may be disposed on a top surface of the optical film OF. The baes film BS may define a top surface (e.g., outer surface) of the display device DD. The base film BS may define the display surface IS. The base film BS may function as a support body for supporting the optical film OF and/or as a protection layer for protecting the optical film OF. In an embodiment, for example, a polyethylene terephthalate ("PET") film or the like may be used as the base film BS.

Referring to FIGS. 5 and 6, an embodiment of the optical film OF may include a first pattern layer RP1 and a second pattern layer RP2. The second pattern layer RP2 may be disposed on or corresponding to the first pattern layer RP1.

The first pattern layer RP1 and the second pattern layer RP2 may have refractive indexes different from each other. In an embodiment, an absolute value of a difference in the refractive indexes between the first pattern layer RP1 and the second pattern layer RP2 may be about 0.2 or more. In an embodiment, for example, an absolute value of a difference in the refractive indexes between the first pattern layer RP1 and the second pattern layer RP2 may be about 0.2 to about to 0.25. When the difference in the refractive indexes between the first pattern layer RP1 and the second pattern layer RP2 is about 0.2 or more, the light which passes through the optical film OF in the liquid crystal display panel DP and is then emitted to outside the optical film OF and/or the base film BS, may be effectively scattered to improve a side viewing angle characteristic of the display device DD.

In an embodiment of the optical film OF, a second refractive index of the second pattern layer RP2 may be smaller than a first refractive index of the first pattern layer RP1. The refractive index of the first pattern layer RP1 may be about 1.4 to about 1.5, the refractive index of the second pattern layer RP2 may be about 1.15 to about 1.27, and an absolute value of the difference in the refractive indexes between the first pattern layer RP1 and the second pattern layer RP2 may be about 0.2 or more. In an embodiment, for example, the refractive index of the first pattern layer RP1 may be about 1.47, and the refractive index of the second pattern layer RP2 may be about 1.27 or less.

The second pattern layer RP2 includes a hollow inorganic particle HP provided in plural (e.g., a plurality of hollow inorganic particles HP). The second pattern layer RP2 which includes the plurality of hollow inorganic particles HP is disposed further from the liquid crystal display panel DP than the first pattern layer RP1. The first pattern layer RP1 is disposed closer to the liquid crystal display panel DP than the second pattern layer RP2.

Figure 7:
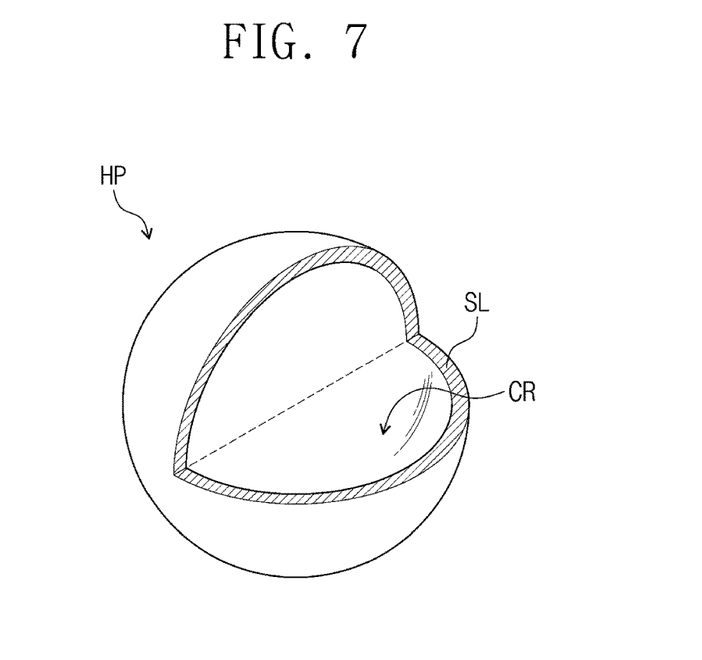
FIG. 7 is a view illustrating an embodiment of a hollow inorganic particle of an optical film.

Each of the hollow inorganic particles HP may have a core-shell shape. FIG. 7 is a perspective view illustrating, as an example, a portion of the hollow inorganic particle HP of the second pattern layer RP2 of the optical film OF. FIG. 7 is an enlarged view for explaining an inside or inner structure of the hollow inorganic particle HP, where a portion of the hollow inorganic particle HP is removed to show the inner structure. In an embodiment, for example, the hollow inorganic particle HP may have a spherical shape.

Each of the hollow inorganic particles HP may include a core portion CR and a shell portion SL that surrounds the core portion CR. The core portion CR may be defined by the shell portion SL. A shape, a dimension, a volume, etc. of the core portion CR may be defined by the shell portion SL.

The shell portion SL may be a layer including or made of an inorganic material. The shell portion SL may include at least one of $SiO_2$, $MgF_2$, and $Fe_3O_4$. In an embodiment, for example, the hollow inorganic particles HP included in the second pattern layer RP2 of the optical film OF may include hollow silica.

The core portion CR may be a void or space defined by the shell portion SL. The core portion CR may be filled with air. Here, the invention is not limited thereto, and the core portion CR in the hollow inorganic particle HP may be filled with a liquid or a gas having a relatively low refractive property.

In an embodiment, the hollow inorganic particle HP may have the spherical shape. An average diameter $D_{HP}$ of the hollow inorganic particles HP may be about 10 nanometers (nm) to about 200 nm. The average diameter $D_{HP}$ of the hollow inorganic particles HP represents an arithmetic average value of the diameters of the plurality of hollow inorganic particles HP. The average diameter $D_{HP}$ may be represented by the plurality of hollow inorganic particles HP within the second pattern layer RP2. Referring to FIG. 6, the diameter $D_{HP}$ of the hollow inorganic particles HP may represent a diameter defined by an outermost edge or outermost surface of the shell portion SL. Such outermost edge or outermost surface of the shell portion SL may define the outermost edge or outermost surface of the hollow inorganic particle HP. The hollow inorganic particle HP content (e.g., quantity, density, etc.) within the second pattern layer RP2 is adjusted by setting the average diameter of the hollow inorganic particles HP to about 10 nm to about 200 nm, and thus the thickness and the refractive index value of the second pattern layer RP2 may be optimized.

In an embodiment, for example, the average diameter of the hollow inorganic particles HP may be about 10 nm to about 100 nm. The average diameter of the hollow inorganic particles HP may be about 60 nm to about 80 nm. A haze value of the second pattern layer RP2 may be adjusted to about 0.5 or less by setting the average diameter of the hollow inorganic particles HP to about 10 nm to about 100 nm.

Also, the second pattern layer RP2 includes a matrix part MX (e.g., matrix portion). The spaces between the hollow inorganic particles HP within the second pattern layer RP2 may be filled with the matrix part MX.

The matrix part MX may include a polymer material. The matrix part MX may include at least one of an acryl-based polymer, a silicon-based polymer, a urethane-based polymer, and an imide-based polymer (e.g., a polymer including an acryl material, a silicone material a urethane material or an imide material). In an embodiment, for example, the matrix part MX may include one polymer material or a combination of a plurality of polymer materials selected from among an acryl-based polymer, a silicon-based polymer, a urethane-based polymer, and an imide-based polymer.

The matrix part MX may include or be made of an acryl-based polymer, a silicon-based polymer, a urethane-based polymer, and an imide-based polymer. The matrix part MX may be provided or formed by combining a polymer resin and the hollow inorganic particles HP, and solidifying the polymer resin having the hollow inorganic particles HP in a relatively high temperature process or an ultraviolet treatment process.

The mechanical properties of the matrix part MX may be controlled by adjusting a reaction site of the polymer resin provided to form the matrix part MX. In an embodiment, for example, the matrix part MX having improved elasticity may be achieved by reducing a curing reaction site in which a curing reaction occurs in the polymer resin, and accordingly, the occurrence of a crack in the second pattern layer RP2 may be suppressed. The matrix part MX including or made of an acryl-based polymer, a silicon-based polymer, a urethane-based polymer, and an imide-based polymer, may exhibit satisfactory mechanical properties when a thickness of the matrix part MX is about 5 micrometers (μm) or more.

The hollow inorganic particle HP content may be about 10 wt % to about 90 wt % with respect to a total weight of the matrix part MX and the hollow inorganic particles HP in the optical film OF. That is, in the second pattern layer RP2, the hollow inorganic particles HP may be included at about 10 wt % to about 90 wt % with respect to the total weight of the matrix part MX and the hollow inorganic particles HP in the optical film OF. In an embodiment, for example, in the second pattern layer RP2, the hollow inorganic particles HP may be included at about 60 wt % to about 80 wt % with respect to the total weight of the matrix part MX and the hollow inorganic particles HP in the optical film OF. Dispersibility of the hollow inorganic particles HP may be enhanced by adjusting the hollow inorganic particle HP content to about 10 wt % to about 90 wt % with respect to the total weight of the matrix part MX and the hollow inorganic particles HP in the optical film OF. Accordingly, a haze value of the second pattern layer RP2 may be adjusted to about 0.5 or less.

Referring to FIGS. 5 and 6, in an embodiment of the optical film OF, the first pattern layer RP1 may include a first base part BL1 (e.g., first base or first base layer) and a first protrusion part EP1 provided in plural (e.g., a plurality of first protrusion parts EP1 or first protrusions) which are extended from the first base part BL1. The plurality of first protrusion parts EP1 may be extended from a common surface (e.g., a top surface) of the first base part BL1, which is indicated along a dotted line in FIG. 6. The plurality of first protrusion parts EP1 may be aligned and disposed on the first base part BL1. Also, the second pattern layer RP2 may be disposed on the first pattern layer RP1, and spaces between the first protrusion parts EP1 adjacent to teach other may be filled with the second pattern layer RP2.

Here, in an embodiment of the optical film OF, the second pattern layer RP2 may include a second base part BL2 (e.g., second base or second base layer) and a second protrusion part EP2 provided in plural (e.g., a plurality of second protrusion parts EP2 or second protrusions) which are extended from the second base part BL2. The plurality of second protrusion parts EP2 may be extended from a common surface (e.g., a bottom surface) of the second base part BL2, which is indicated along a dotted line in FIG. 6. In an embodiment of the optical film OF, the plurality of second protrusion parts EP2 may be aligned and disposed on a bottom side of the second base part BL2. In an embodiment of the optical film OF, the first protrusion parts EP1 and the second protrusion parts EP2 are alternately arranged with each other. That is, the second protrusion parts EP2 may correspond to the spaces between the first protrusion parts EP1 adjacent to teach other, and may fill such spaces.

In an embodiment of the optical film OF, the hollow inorganic particles HP may be included in both the second base part BL2 and the second protrusion parts EP2.

In an embodiment, each of the first protrusion parts EP1 and the second protrusion parts EP2 may have a stripe shape that extends along a direction. Each of the first protrusion parts EP1 and the second protrusion parts EP2 is arranged to form a striped pattern within a plane defined by the first directional axis DR1 and the second directional axis DR2.

Referring to FIG. 5, each of the first protrusion parts EP1 and the second protrusion parts EP2 may lengthwise extend (e.g., extension direction) along the second directional axis DR2. When referring to FIGS. 1 to 5, or the like, an extension direction of the protrusion parts EP1 and EP2 of the optical film OF may be parallel to a vertical direction of a plane along which the display surface IS of the electronic apparatus ED is viewed. In an embodiment, the extension direction of the protrusion parts EP1 and EP2 of the optical film OF in the display device DD illustrated in FIGS. 1 and 2, or the like may be parallel to a relatively short side of the display device DD (e.g., along the second directional axis DR2 in FIG. 5). The second directional axis DR2 is a direction in a plane which is perpendicular to a direction along which the display surface IS is viewed.

Here, FIG. 1 or the like illustrates that along a left-and-right direction (e.g., first directional axis DR1) of the display surface IS of the electronic apparatus ED is a direction of a relatively long side, and that along an up-and-down direction thereof is a direction of the relatively short side (e.g., second directional axis DR2). However, the invention is not limited thereto. Unlike the drawings, the left-and-right direction of the display surface IS of the electronic apparatus ED may be a direction of the short side, and the up-and-down direction thereof may be a direction of the long side, with respect to a viewing direction of the electronic apparatus ED. In this case, the extension direction of the protrusion parts EP1 and EP2 of the optical film OF may be parallel to the long side of the display device DD.

Referring to FIG. 6, in a plane defined by the first directional axis DR1 and the third directional axis DR3, the cross-section of the first protrusion part EP1 may have a trapezoidal shape. However, the invention is not limited thereto. The shape of the cross-section of each of the first protrusion parts EP1 and the second protrusion parts EP2, an interval between adjacent ones of the plurality of the first protrusion parts EP1, or the like may be variously adjusted in consideration of improvements in a light extraction efficiency and a side viewing angle.

In an embodiment, for example, in the cross-section defined by the first directional axis DR1 and the third directional axis DR3, each of the first protrusion parts EP1 may have a polygonal shape such as a rectangular shape or a lens shape. That is, each of the first protrusion parts EP1 may have a top surface which is flat (e.g., with a flat pattern) or which protrudes towards the second pattern layer RP2 (e.g., with a protruding shape) so that a top surface is curved to define a curved face or curved end. Also, each of the first protrusion parts EP1 may exhibit a cross-sectional shape in which a plurality of side surface portions have different inclination angles relative to the first base part BL1.

Referring to FIG. 5, the first pattern layer RP1 may include the plurality of first protrusion parts EP1, and a first recess part CP1 (e.g., first recess or first space) may be defined between adjacent ones of the first protrusion parts EP1. The second pattern layer RP2 may include the second protrusion parts EP2 and a second recess part CP2 (e.g., second recess or second space) may be defined between adjacent ones of the second protrusion parts EP2. Within a pattern layer, a portion of a respective base part thereof may be exposed at a recess part thereof.

Grooves defined by the first protrusion parts EP1 and the first recess parts CP1 of the first pattern layer RP1 may correspond to grooves defined by the second recess parts CP2 and the second protrusion parts EP2 of the second pattern layer RP2. In an embodiment, for example, the first protrusion parts EP1 of the first pattern layer RP1 may be disposed to correspond to the second recess parts CP2 of the second pattern layer RP2, and the second protrusion parts EP2 of the second pattern layer RP2 may be disposed to correspond to the first recess parts CP1 of the first pattern layer RP1. That is, the first protrusion part EP1 may be insertable into the second recess parts CP2, and the second protrusion parts EP2 may be insertable into the first recess parts CP1. As being inserted, a protrusion part may completely fill a recess part. Shapes of a protrusion part and a corresponding recess part may complement each other such that the recess part is completely filled by the protrusion part, without being limited thereto. In an embodiment, an end (e.g., top surface) of a protrusion part of one pattern layer may contact the base part of the other pattern layer, without being limited thereto.

In an embodiment, the first protrusion part EP1 in the optical film OF illustrated in FIGS. 5 and 6 may have a trapezoidal shape in the cross-section perpendicular to the first base part BL1. The inclination angle of a side surface of the first protrusion part EP1 relative to the first base part BL1 may be about 69° to about 90°.

A thickness $H_{RP2}$ of the second pattern layer RP2 may be about 5 μm to about 15 μm. The thickness $H_{RP2}$ of the second pattern layer RP2 may be related to a thickness in the third directional axis DR3, and may include the thicknesses of both the second base part BL2 and the second protrusion part EP2, to define a total thickness of the second pattern layer RP2.

Here, the shape of the optical film OF is not limited to the embodiments described with reference to FIGS. 5 and 6. Unlike the illustration of FIG. 5 or the like, the first protrusion part EP1 and the second protrusion part EP2 may not have a striped shape which lengthwise extends along one direction, and each of the plurality of the first protrusion parts EP1 and the plurality of the second protrusion parts EP2 may have a square pillar shape or a quadrangular pyramid shape extending along the third directional axis DR3. However, the invention is not limited thereto, and the first protrusion parts EP1 of the first pattern layer RP1 may be provided in various pattern shapes, and the second pattern layer RP2 may be disposed on the first pattern layer RP1 to cover the first protrusion parts EP1.

The display device DD including the optical film OF according to an embodiment may exhibit excellent display quality. That is, one or more embodiment of the display device DD including the optical film OF, may have an increased amount of white light emitted toward the front direction (e.g., a light emitting direction such as in the third directional axis DR3), an increased contrast ratio, and an enhanced gamma distortion index ("GDI") value in a direction of a 60° side viewing angle, thereby exhibiting excellent display quality.

TABLE 1

| Classification | Comparative example | Embodiment |
| --- | --- | --- |
| 60° GDI | 0.19 | 0.15 |
| Luminance (%) | 85 | 90 |
| Contrast Ratio | 1600 | 2480 |

Table 1 shows a comparison of display quality characteristics between an embodiment of the display device DD (Embodiment) including the optical film OF described with reference to FIGS. 5 and 6 in a structure of the display device DD in FIG. 3, and a comparative display device in (Comparative Example), including a comparative optical film including pattern layers having refractive indexes different from those of the Embodiment.

Embodiment in Table 1 has a shape of the optical film OF illustrated in FIG. 5, and has a refractive index value of about 1.47 in the first pattern layer RP1 and a refractive index value of about 1.27 in the second pattern layer RP2. Comparative Example in Table 1 has a shape of the optical film OF illustrated in FIG. 5, but has a refractive index value of about 1.47 in the first pattern layer RP1 and a refractive index value of about 1.60 in the second pattern layer RP2. Table 1 compares luminance of white light in the front direction, contrast ratios, gamma distortion index ("GDI") values in the direction of a 60° side viewing angle are compared.

Referring to results of Table 1, the Embodiment has a higher luminance in the front direction and an improved GDI value when compared to the Comparative Example. Also, the Embodiment has an improved contrast ratio when compared to the Comparative Example. That is, the display device DD having a configuration of the optical film OF in the Embodiment illustrated with reference to FIGS. 5 and 6 exhibits an improved display quality in the front and side directions than a configuration of the Comparative Example.

Figure 8:
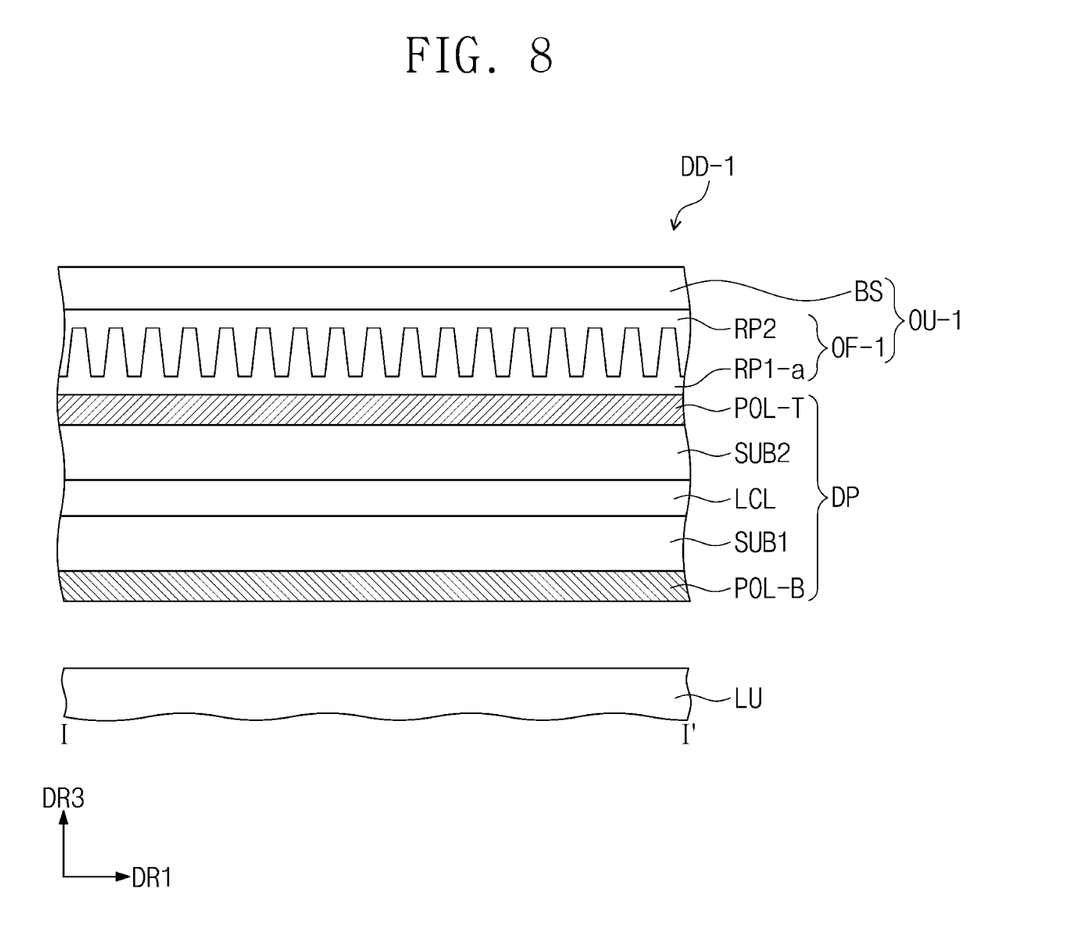
FIG. 8 is a cross-sectional view illustrating an embodiment of a display device.

FIG. 8 is a cross-sectional view illustrating an embodiment of a display device DD-1. In the descriptions of a display device DD-1 illustrated in FIG. 8, the duplicated features with those of FIGS. 1 to 7 are not described again, but their differences will be mainly described. A display device DD-1 includes a liquid crystal display panel DP and an optical film OF-1 disposed above the liquid crystal display panel DP. The display device DD-1 may include a light source member LU that is disposed below the liquid crystal display panel DP and an optical member OU-1 that is disposed above the liquid crystal display panel DP and includes the optical film OF-1.

The optical film OF-1 included in the display device DD-1 includes a first pattern layer RP1-*a* and a second pattern layer RP2. The second pattern layer RP2 may have a refractive index lower than that of the first pattern layer RP1-*a*. The refractive index value of the first pattern layer RP1-*a* may be about 1.4 to about 1.5, and the refractive index value of the second pattern layer RP2 may be about 1.15 to about 1.27. The difference in the refractive indexes between the first pattern layer RP1-*a* and the second pattern layer RP2 may be about 0.2 or more.

Also, the second pattern layer RP2 may include hollow inorganic particles. In an embodiment, for example, the second pattern layer RP2 may include hollow silica as described above.

In the optical film OF-1 included in the display device DD-1, the arrangement of the first pattern layer RP1-*a* and the second pattern layer RP2 may be the same as the arrangement in the optical film OF according to the embodiment described in FIG. 6.

However, the first pattern layer RP1-*a* in the optical film OF-1 according to an embodiment may function as an adhesive layer. The first pattern layer RP1-*a* may serve as a coupling member for coupling the optical member OU-1 and a neighboring layer such as the polarization layer POL-T of the liquid crystal display panel DP to each other. In an embodiment, for example, the first pattern layer RP1-*a* may be an adhesive layer including an optically clear adhesive material.

That is, in the display device DD-1, the optical film OF-1 may be disposed directly on the liquid crystal display panel DP. Compared to the display device DD illustrated in FIG. 3, the adhesive layer AD may be omitted between the liquid crystal display panel DP and the optical member OU-1. That is, the liquid crystal display panel DP, the adhesive layer, the first pattern layer RP1-*a*, the second pattern layer RP2 and the base film BS may be disposed in order from the light source member LU, without being limited thereto.

One or more embodiment of the display device DD may include the optical film OF with two pattern layers that are disposed on a display panel and have different refractive indexes from each other, and thus may exhibit the improved characteristics of a viewing angle, front luminance and contrast ratio. One or more embodiment of the optical film OF included in the display device DD includes the low refractive pattern layer including the hollow inorganic particles HP and the high refractive layer that simultaneously functions as the adhesive layer AD. Therefore, omission of a separate adhesive layer while improving the viewing angle characteristics and light extraction function of the display device DD is possible, thereby improving processibility and reducing costs when the display device DD is manufactured.

One or more embodiment may provide the display device DD in which the two pattern layers having the optimized refractive index values are included in the optical film OF to exhibit the improved display quality.

One or more embodiment may provide the display device DD in which the hollow inorganic particles HP are included in the respective pattern layer having relatively low refractive index to optimize the difference in the refractive index values between two pattern layers constituting the optical film OF, thereby exhibiting the improved display quality.

Although described with reference to embodiments of the present disclosure, it will be understood that various changes and modifications of the present disclosure may be made by one skilled in the art or one having ordinary knowledge in the art without departing from the spirit and technical field of the present disclosure as hereinafter claimed.

Hence, the technical scope of the present disclosure is not limited to the detailed descriptions in the specification, but it should be determined only by reference of the claims.

What is claimed is:

1. A display device comprising:
a display panel from which light is emitted; and
an optical film to which the light from the display panel is incident, the optical film comprising:
a first pattern layer having a first refractive index, and
a second pattern layer having a second refractive index lower than the first refractive index, the second pattern layer including a plurality of hollow inorganic particles,
wherein the second pattern layer which has the second refractive index lower than the first refractive index and includes the plurality of hollow inorganic particles, is disposed further from the display panel than the first pattern layer.

2. The display device of claim 1, wherein within the optical film, a difference between the second refractive index of the second pattern layer including the plurality of hollow inorganic particles and disposed further from the display panel than the first pattern layer, and the first refractive index of the first pattern layer, is about 0.2 or more.

3. The display device of claim 1, wherein within the optical film, the first refractive index of the first pattern layer which is disposed closer to the display panel than the second pattern layer, is from about 1.4 to about 1.5.

4. The display device of claim 1, wherein within the optical film, the second refractive index of the second pattern layer including the plurality of hollow inorganic particles and disposed further from the display panel than the first pattern layer, is from about 1.15 to about 1.27.

5. The display device of claim 1, wherein within the optical film, each of the plurality of hollow inorganic particles within the second pattern layer having the second refractive index lower than the first refractive index and disposed further from the display panel than the first pattern layer, comprises a core portion and a shell portion which surrounds the core portion.

6. The display device of claim 1, wherein within the optical film, each of the plurality of hollow inorganic particles within the second pattern layer having the second refractive index lower than the first refractive index and disposed further from the display panel than the first pattern layer, has a spherical shape and an average diameter from about 10 nanometers to about 200 nanometers.

7. The display device of claim 1, wherein within the optical film, the second pattern layer having the second refractive index lower than the first refractive index and disposed further from the display panel than the first pattern layer, further comprises a matrix portion in which the plurality of hollow inorganic particles are disposed, the matrix portion filling spaces between the plurality of hollow inorganic particles.

8. The display device of claim 7, wherein the matrix portion of the second pattern layer comprises a polymer including an acryl material, a silicone material a urethane material or an imide material.

9. The display device of claim 7, wherein in the second pattern layer having the second refractive index lower than the first refractive index and disposed further from the display panel than the first pattern layer, the plurality of hollow inorganic particles is from about 10 wt % to about 90 wt % with respect to a total weight of the matrix portion and the plurality of hollow inorganic particles.

10. The display device of claim 1, wherein within the optical film, the first pattern layer which is disposed closer to the display panel than the second pattern layer, comprises:
a first base layer, and
a plurality of first protrusions extended from the first base layer and toward the second pattern layer.

11. The display device of claim 10, wherein the second pattern layer having the second refractive index lower than the first refractive index, including the plurality of hollow inorganic particles and disposed further from the display panel than the first pattern layer, comprises:
a second base layer facing the first base layer with the plurality of first protrusions therebetween; and
a plurality of second protrusions extended from the second base layer and toward the first base layer.

12. The display device of claim 11, wherein within the optical film, each of the plurality of first protrusions and the plurality of second protrusions has a stripe shape.

13. The display device of claim 12, wherein within the optical film,
the first pattern layer comprises a plurality of first recesses respectively defined between the plurality of first protrusions,
the second pattern layer comprises a plurality of second recesses respectively defined between the plurality of second protrusions,
the plurality of first protrusions correspond to the plurality of second recesses, respectively, and
the plurality of second protrusions correspond to the plurality of first recesses, respectively.

14. The display device of claim 1, wherein the first pattern layer within the optical film includes an optically clear adhesive material and couples the display panel and the optical film to each other.

15. The display device of claim 14, wherein the optical film including the optically clear adhesive material is disposed directly on the display panel.

16. A display device comprising:
- a display panel from which light is emitted; and
- an optical film to which the light from the display panel is incident,
- wherein the optical film comprises:
    - a first pattern layer having a first refractive index of about 1.4 to about 1.5; and
    - a second pattern layer facing the display panel with the first pattern layer therebetween and having a second refractive index of about 1.15 to about 1.27.

17. The display device of claim 16, wherein within the optical film, the second pattern layer facing the display panel with the first pattern layer therebetween and having the second refractive index of about 1.15 to about 1.27, comprises a plurality of hollow inorganic particles.

18. The display device of claim 16, wherein within the optical film, a difference between the second refractive index of the second pattern layer facing the display panel with the first pattern layer therebetween and having the second refractive index of about 1.15 to about 1.27, and the first refractive index of the first pattern layer, is about 0.2 or more.

19. The display device of claim 16, wherein the display panel comprises:
- a first substrate and a second substrate facing each other;
- an optical control layer disposed the first substrate and the second substrate; and
- a polarization layer between the second substrate and the optical film having the first pattern layer and the second pattern layer,
- wherein the first pattern layer of the optical film is directly on the polarization layer of the display panel.

20. The display device of claim 16, wherein the first pattern layer within the optical film includes an optically clear adhesive material and couples the display panel and the optical film to each other.

* * * * *